United States Patent [19]

Graff et al.

[11] 4,305,019
[45] Dec. 8, 1981

[54] WARM-WHITE FLUORESCENT LAMP HAVING GOOD EFFICACY AND COLOR RENDERING AND USING SPECIAL PHOSPHOR BLEND AS SEPARATE UNDERCOAT

[75] Inventors: Eugene A. Graff, Cedar Grove; Jacob Van Broekhoven, North Caldwell, both of N.J.

[73] Assignee: Westinghouse Electric Corp., Pittsburgh, Pa.

[21] Appl. No.: 109,008

[22] Filed: Dec. 31, 1979

[51] Int. Cl.³ .............................................. H01J 61/48
[52] U.S. Cl. ................................................. 313/487
[58] Field of Search ........................................ 313/487

[56] References Cited

U.S. PATENT DOCUMENTS

| | | | |
|---|---|---|---|
| 3,602,757 | 8/1971 | Wachtel | 313/487 |
| 3,602,758 | 8/1971 | Thornton et al. | 313/487 |
| 3,670,194 | 6/1972 | Thornton, Jr. et al. | 313/487 |
| 3,858,082 | 12/1974 | Thornton, Jr. | 313/487 |
| 3,875,453 | 4/1975 | Thornton, Jr. | 313/487 |
| 3,937,998 | 2/1976 | Verstegen et al. | 313/487 |
| 4,088,923 | 5/1978 | Manders | 313/487 |

*Primary Examiner*—Palmer C. Demeo
*Attorney, Agent, or Firm*—W. D. Palmer

[57] ABSTRACT

Special commercially available fluorescent lamps of warm-white correlated color temperature of about 3000° K. have both good coloring index and efficacy. These lamps utilize as the light-emitting component a special three-component phosphor blend having emissions principally confined to the wavelength regions of from 430 nm to 485 nm, from 515 nm to 570 nm, and from 588 nm to 630 nm. This phosphor blend is relatively expensive and to decrease expense, it is known to utilize an undercoat of halophosphate phosphor of the same emission color, which decreases the amount of expensive phosphor required. To provide the dual function of decreasing the amount of expensive phosphor blend and also to screen any possible color shifts which might occur in the high performance phosphor blend, without appreciably affecting overall lamp performance, there is provided a phosphor undercoat of very particular phosphor which not only is less expensive than the three-component blend, but which in itself has both good color rendering properties and efficacy. In this manner, lamp costs are decreased and possible color shifts are screened without materially affecting overall lamp performance.

4 Claims, 3 Drawing Figures

WARM-WHITE FLUORESCENT LAMP HAVING GOOD EFFICACY AND COLOR RENDERING AND USING SPECIAL PHOSPHOR BLEND AS SEPARATE UNDERCOAT

CROSS-REFERENCE TO RELATED APPLICATION

In copending Application Ser. No. 108,269, filed concurrently herewith, by Henry Skwirut and Robert G. Young, is disclosed an improved fluorescent lamp which utilizes a three-component high-performance phosphor blend coated as a layer next to the envelope with a very thin layer of protective phosphor thereover so that it faces the discharge. The thin protective layer can be a blend of calcium fluoroapatite activated by antimony and manganese and yttrium oxide activated by a trivalent europium for a lamp of warm-white color.

BACKGROUND OF THE INVENTION

This invention generally relates to fluorescent lamps and, more particularly, to an improved fluorescent lamp of warm-white color which has both good efficacy and good color rendering properties.

Fluorescent lamps are fabricated to provide various color temperatures of emission which generally correspond to the color temperature of a complete or full radiator maintained at the specified temperature. A warm-white correlated color temperature is specified as being about 3,000° K. and cool-white color temperature is specified as being about 4,100° K. For illumination in the home, the public seems to prefer the warm color, possibly due to long-time familiarity with the incandescent lamp which has a warm color.

A standard warm-white fluorescent lamp which is designed to operate with a correlated color temperature of about 3,000° K. is normally fabricated with a halophosphate phosphor. Such lamps have reasonably good lumen output, a representative output being 3,100 lumens for a 40 watt lamp, but the color rendering properties of such lamps are relatively poor. Fluorescent lamps which have a warm-white color and relatively good color rendering properties have been available on the market for a number of years, but the lumen output of these lamps is relatively poor and a considerable sacrifice in lumens is made in order to obtain the good color rendering properties.

In U.S. Pat. No. 3,937,998, dated Feb. 10, 1976 to Verstegen et al is disclosed a three-component phosphor blend for use in fluorescent lamps to provide both good color rendition of illuminated objects and a high light output. The components comprising this phosphor blend are very expensive and to decrease the need for these expensive components, there is disclosed in U.S. Pat. No. 4,088,923, dated May 9, 1978, to Manders an underlayer of relatively inexpensive halophosphate phosphor of the same emission color so that the expensive phosphor blend components are "worked harder", and less material is required.

In U.S. Pat. No. 3,858,082, dated Dec. 3, 1974, to Thornton is disclosed a three-component phosphor blend for use in fluorescent lamps which provide both good color rendition of illuminated objects and a high light output. One of the components comprising this blend is expensive and to decrease the amount of this expensive component which is needed, the blend can be coated as separate layers with the expensive blend component positioned next to the discharge so that it will "work harder." Such a separate layer construction is disclosed in U.S. Pat. No. 3,602,758, dated Aug. 31, 1971 to Thornton et al.

In copending Application Ser. No. 058,574, filed July 17, 1979, by J. Van Broekhoven, one of the present applicants, and R. Corth, and owned by the present assignee, now U.S. Pat. No. 4,263,530, is disclosed a fluorescent lamp which incorporates a phosphor blend of warm-white color which comprises a mixture of calcium fluoroapatite activated by antimony and manganese and yttrium oxide activated by trivalent europium. The resulting lamp has both improved output and color rendering index as well as improved color preference index as compared to a standard fluorescent lamp which incorporates a halophosphate phosphor of the same color temperature.

The internationally accepted procedure for standardizing and measuring the color rendering properties of light sources is set forth in the publication of The International Commission on Illumination, identified as Publication CIE No. 13 (E-1.3.2) 1965. More recently, a color-preference index has been proposed for rating the performance of light sources in accordance with what the normal observer considers to be the preferred coloration for familiar objects. This color preference index (CPI) is summarized in the Journal of the Illuminating Engineering Society, pages 48–52 (October 1974) article entitled "A Validation of the Color-Preference Index" by W. A. Thornton.

SUMMARY OF THE INVENTION

There is provided a fluorescent lamp having a warm-white color and combined high efficacy and good color rendition. The basic lamp comprises a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations. A phosphor means comprises a predetermined amount of a first phosphor layer carried on the inner surface of the envelope and a predetermined amount of a second phosphor layer coated on and carried on the first phosphor layer so that the second phosphor layer is positioned nearest to the discharge. The first phosphor layer comprises a mixture of predetermined amounts and relative proportions of apatite-structured calcium fluorophosphate activated by antimony and manganese and yttrium oxide activated by trivalent europium. The apatite structured material has a broadband emission of visible radiations and the yttrium oxide material has a narrow emission in the red-orange region of the visible spectrum, and the relative phosphor proportions are such that the composite emission of the first phosphor layer falls approximately within the warm-white ellipse as inscribed on the x-y chromaticity diagram of the ICI system. The second phosphor layer which is coated over the first phosphor layer principally comprises a mixture of predetermined amounts and relative proportions of narrow-band blue-emitting phosphor activated by divalent europium and having an emission substantially confined to the wavelength range of from 430 nm to 435 nm, green-emitting phosphor having an emission substantially confined to the wavelength range of from 515 nm to 570 nm, and red-orange emitting phosphor having an emission substantially confined to the wavelength range of from 588 nm to 630 nm. The predetermined amounts and relative proportions of the mixed phosphor comprising the second layer are such that the composite emission from the second phosphor layer falls approximately within the warm-white ellipse as inscribed on the x-y chromaticity diagram of the ICI system. The composite emissions of the first phosphor layer and the second phosphor layer coupled with the limited proportion of visible radiations generated by the discharge cause the total visible emissions from the energized lamp to fall within the warm-white ellipse as inscribed on the x-y chromaticity diagram.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
FIG. 1 is an elevational view, partly broken away, of a fluorescent lamp which incorporates the specific combined double layer phosphor.

With specific reference to the form of the invention illustrated in the drawings, the lamp 10 as shown in FIG. 1 is generally conventional and comprises a sealed, elongated, light-transmitting envelope 12 having electrodes 14 operatively positioned therein proximate the ends thereof and enclosing a discharge-sustaining filling comprising mercury 16 and a small charge of inert ionizable starting gas, such as a few torrs of argon or mixed argon and neon, for example. When the lamp is energized, the resulting low-pressure mercury discharge generates ultraviolet radiations and a limited proportion of visible radiations, with the latter constituting a strong mercury line at 436 nm, a relatively strong green line at 546 nm, and a relatively weak line at 578 nm, with the composite mercury emission appearing blue to the eye.

Coated on the inner surface of the envelope is a phosphor means comprising a predetermined amount of a first phosphor layer 18 carried on the inner surface of the envelope 12 and a predetermined amount of a second phosphor layer 20 coated on and carried on the first phosphor layer 18 so that the second phosphor layer 20 is positioned nearest to the discharge of the operating lamp. The first phosphor layer 18 is a selected mixture of calcium fluoroapatite and europium-activated yttrium oxide as described in heretofore referenced U.S. Pat. No. 4,263,530. More specifically, the first phosphor layer comprises a mixture of predetermined amounts and relative proportions of apatite-structured calcium fluorophosphate activated by antimony and manganese and yttrium oxide activated by a trivalent europium. The antimony activator constitutes from 0.4 to 1 weight percent and the manganese activator constitutes from 1 to 1.5 weight percent of the apatite-structured calcium fluorophosphate phosphor. The europium activator constitutes from 2 to 13 weight percent of the yttrium oxide phosphor. The apatite-structured calcium fluorophosphate phosphor exhibits a broadband emission of visible radiations and the yttrium oxide phosphor exhibits a narrow emission in the red-orange region of the visible spectrum. The predetermined amounts and relative proportions of the apatite-structured fluorophosphate and the yttrium oxide phosphor are such that the composite emission of the first phosphor layer 18 falls approximately within the warm-white ellipse as inscribed on the x-y chromaticity diagram of the ICI system which is shown in FIGS. 2 and 3.

The second phosphor layer 20 principally comprises a mixture of predetermined amounts and relative proportions of narrow-band blue-emitting phosphor activated by divalent europium having an emission substantially confined to the wavelength range of from 430 nm to 485 nm, green-emitting phosphor having an emission substantially confined to the wavelength range of from 515 nm to 570 nm, and red-orange emitting phosphor having an emission substantially confined to the wavelength range of from 588 nm to 630 nm. The predetermined amounts and relative proportions of the mixed phosphors comprising the second phosphor layer 20 are such that the composite emission from the second phosphor layer falls approximately within the warm-white ellipse as inscribed on the x-y chromaticity diagram of the ICI system as shown in FIGS. 2 and 3.

Figure 3:
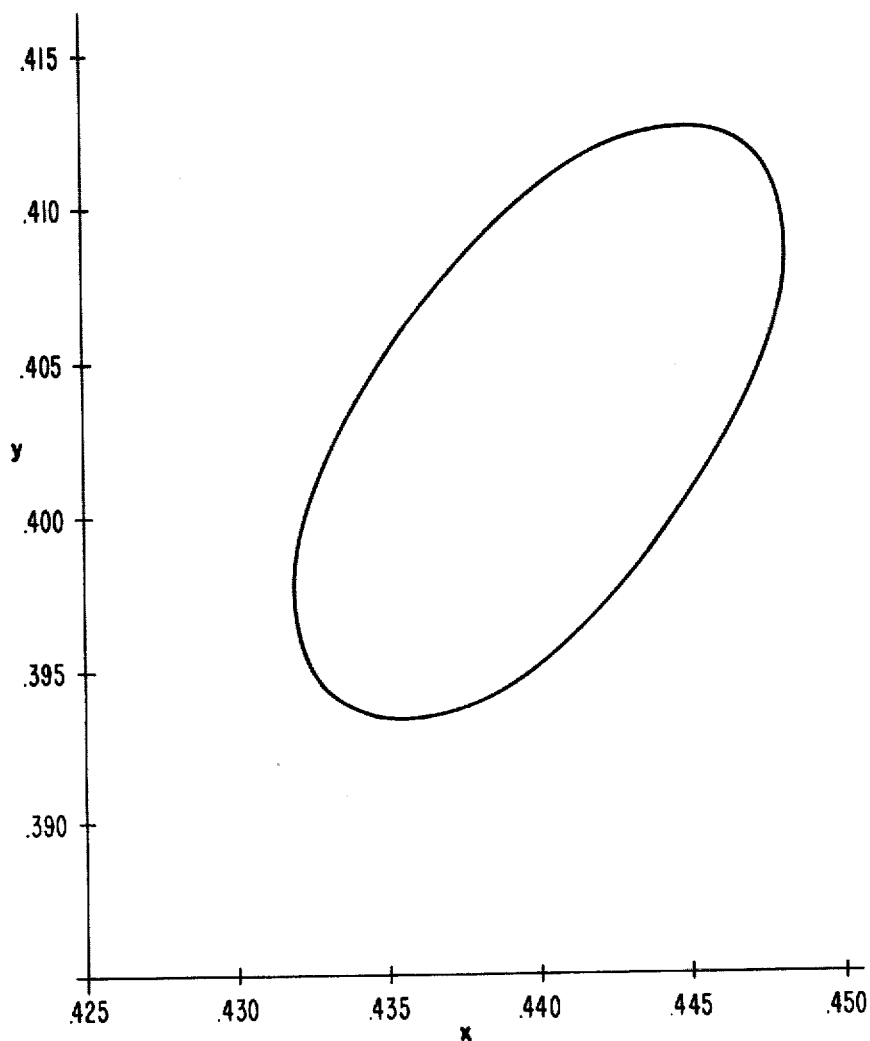
FIG. 3 is an enlarged showing of the portion of the ICI diagram which has inscribed thereon the so-called warm-white ellipse which describes the limits for the ICI coordinates for a lamp having a correlated color temperature of 3000° K.
Figure 2:
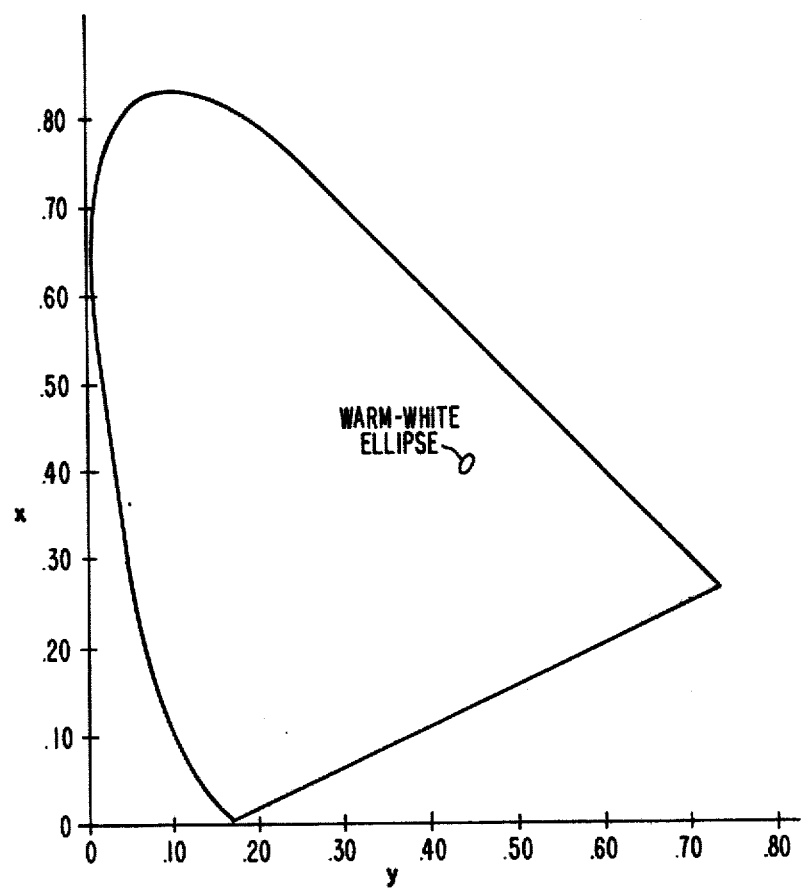
FIG. 2 is a reproduction of the x-y chromaticity diagram of the ICI system.

The combined emissions from the first phosphor layer 18 and the second phosphor layer 20 coupled with the limited proportion of visible radiations generated by the discharge cause the total visible emissions from the energized lamp to fall within the warm-white ellipse as inscribed on the x-y chromaticity diagram of the ICI system as shown in FIGS. 2 and 3.

To prepare the calcium fluoroapatite phosphor of layer 18, 3 moles of $CaHPO_4$ are mixed with 1.108 moles $CaCO_3$, 0.45 mole $CaF_2$, 0.142 mole $MnCO_3$, 0.05 mole $CdCO_3$, and 0.025 mole $Sb_2O_3$. Preferably, 0.09 mole of $NH_4Br$ is added as a reaction promoter although the bromine does not enter into the final composition. The foregoing ingredients are thoroughly mixed and are fired at a temperature of 1,160° C. for three hours in a nitrogen atmosphere. Thereafter, the finished material is reduced to finely divided status, preferably washed with a dilute solution of nitric acid, water washed, and spray dried. The cadmium need not be used, but a small addition is preferred for best performance. The phosphor can be expressed by the formula $3Ca_3(PO_4).CaF_2:Sb,Mn$. In the final phosphor, the antimony activator constitutes from 0.4 to 1% by weight of the phosphor and the manganese activator constitutes from 1% to 1.5% by weight of the phosphor, with the preferred activator concentrations being about 0.7% by weight antimony and 1.3% by weight manganese. As a specific example, the phosphor has an average particle size of about 12 microns.

To prepare the yttrium oxide phosphor, yttrium oxide and europium oxide are mixed in the desired gram mole ratios as desired in the final phosphor, together with from 5% to 30% by weight of zinc chloride as a flux, with a preferred flux addition being from 10% to 20% by weight of the phosphor constituents. The foregoing constituents are fired at from 1,250° C. to 1,400° C., with 1,350° C. being preferred, for a period of from 3 hours to 20 hours, with 12 hours being preferred. The phosphor can be expressed by the formula $(Y_{1-x}Eu_x)_2O_3$, wherein x is from 0.03 to 0.2, with the preferred value of x being 0.09. In the final phosphor, the europium constitutes from 2% to 13% by weight of the phosphor with about 6% by weight europium being preferred. After firing, the phosphor is reduced to finely divided status and is thereafter ready for a coating. As a specific example, the phosphor has an average particle size of about 7 microns.

For coating onto the envelope as shown in FIG. 1, the phosphors comprising the layer 18 are mixed in the weight ratio of about 79% calcium fluoroapatite and about 21% yttrium oxide. The coating technique is conventional wherein the phosphors are suspended as a slurry in a vehicle such as water, with a small amount of organic binder material, with added components such as wetting and deflocculating agents. After application of the slurry to the inner surface of the envelope, the envelope is lehred to volatilize the organics leaving the resulting phosphor material evenly adhered thereon as a powder layer. Details of coating techniques are described in U.S. Pat. No. 3,832,199, dated Aug. 24, 1974 and No. 3,833,392, dated Sept. 3, 1974. The first phosphor layer 18 is applied to a coating weight of from about 1 mg/cm$^2$ to about 3.1 mg/cm$^2$. For a 40WT12 bulb, this is equivalent to a phosphor coating weight of from about 1.5 grams to about 6.4 grams. As a specific example, the layer 18 is coated to a weight of 2.3 mg/cm$^2$.

For best overall performance of the composite lamp, the layer 20 comprises a mixture of yttrium oxide activated by trivalent europium as the red-orange emitter, zinc silicate activated by manganese as the green emitter and strontium chloroapatite activated by divalent europium as the blue emitter. Technically, this latter component emits in the blue-violet region of the visible spectrum. Such a phosphor combination is disclosed in heretofore referenced U.S. Pat. No. 3,858,082. In order to provide a warm-white emission, the phosphor components are mixed in the relative weight proportions of about 72% yttrium oxide, 24% zinc silicate, and 4% strontium chloroapatite. The phosphor is applied similarly to the first phosphor layer. The second phosphor layer 20 has a coating weight of from about 1 mg/cm$^2$ to about 3.1 mg/cm$^2$. As a specific example, the layer 20 is coated to a weight of 2.3 mg/cm$^2$. As a further limitation for the combined phosphor coatings, the combined coating weights of the first layer 18 and the second layer 20 should fall within the range of from about 3.1 mg/cm$^2$ to about 5.5 mg/cm$^2$. For a 40WT12 bulb, this is equivalent to a combined phosphor coating weight of from about 4 grams to about 7 grams.

The zinc silicate component of the second phosphor layer 20 occasionally tends to exhibit a depreciation in light output, particularly at the ends of the lamp proximate the electrodes. This tends to change the appearance of the lamp proximate the electrodes to give the effect of a pinkish color. While such a limited color shift does not effect the performance of the lamp, it can be considered objectionable from an aesthetic standpoint. The provision of the undercoat layer 18 provides a screening effect for this color shift thereby to minimize the aesthetic objections. In addition, the relatively thin layer of undercoat which is used permits a thinner layer of the relatively expensive phosphor blend 20 to be used, thereby decreasing the cost. As a specific example, a typical representative coating weight for a three-component phosphor blend when used alone is about 4.7 mg/cm$^2$. The specific blend comprising the calcium fluoroapatite and yttrium oxide blend when used alone will provide a fluorescent lamp with a slightly increased efficacy as compared to a warm-white halophosphate phosphor, a typical improvement being about 3%. More important, the color rendering index for a lamp which incorporates only the phosphor blend of the underlayer is about 60 as compared to a color rendering index of 51 for a lamp using the standard warm-white halophosphate. Equally important, the measured color preference index for a lamp which incorporates only the phosphor blend of the under-layer is about 52, as compared to a color preference index of 37 for a standard warm-white lamp. This increase in color preference index and color rendering index for the present underlayer, as compared to the halophosphate, reflects in an improved overall performance for the present lamps.

As a specific example, lamps fabricated in accordance with the present invention to provide a two-layer coating displayed a 100 hour lumen output which averaged about 10% greater than control lamps which incorporated only the three-component blend used for the layer 20. The color rendering index of the double layer lamps of the present invention averaged about 86 to 87 as compared to 82 for the lamps which incorporated only the three-component blend used for the layer 20. Equally important, the color preference index of the lamps which incorporate only the three-component blend averaged about 115 and this decreased only slightly to a value of 106 to 108 for lamps using the present two layer phosphor coating. Thus the lumen output of the lamps not only was increased, but the color rendering properties were only minimally affected while simultaneously effecting a screening for the three-component blend to minimize any objections to color shifts at the ends of the lamps.

What is claimed is:

1. A fluorescent lamp having a warm-white correlated color temperature of about 3000° K. and combined high efficacy and good color rendition, said lamp comprising a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations, phosphor means comprising a predetermined amount of a first phosphor layer carried on the inner surface of said envelope and a predetermined amount of a second phosphor layer coated on and carried on said first phosphor layer so that said second phosphor layer is positioned nearest to said discharge;

(a) said first phosphor layer principally comprising a mixture of predetermined amounts and relative proportions of apatite-structured calcium fluorophosphate activated by antimony and manganese and yttrium oxide activated by trivalent europium, said antimony activator constituting from 0.4 to 1 weight percent and said manganese activator constituting from 1 to 1.5 weight percent of said apatite-structured calcium fluorophosphate phosphor, said europium activator constituting from 2 to 13 weight percent of said yttrium oxide phosphor, said apatite-structured calcium fluorophosphate phosphor having a broad band emission of visible radiations, said yttrium oxide phosphor having a narrow emission in the red-orange region of the visible spectrum, and the predetermined amounts and relative proportions of said apatite-structured calcium fluorophosphate phosphor and said yttrium oxide phosphor being such that the composite emission of said first phosphor layer falls approximately within the warm-white ellipse as inscribed on the x-y chromaticity diagram of the ICI system;

(b) said second phosphor layer principally comprising a mixture of predetermined amounts and relative proportions of narrow-band blue-emitting phosphor activated by divalent europium having an emission substantially confined to the wavelength range of from 430 nm to 485 nm, green-emitting phosphor having an emission substantially confined to the wavelength range of from 515 nm to 570 nm, and red-orange emitting phosphor having an emission substantially confined to the wavelength range of from 588 nm to 630 nm, and the predetermined amounts and relative proportions of said mixed phosphors comprising said second phosphor layer being such that the composite emission from said second phosphor layer falls approximately within the warm-white ellipse as inscribed on the x-y chromaticity diagram of the ICI system; and (c) said composite emissions of said first phosphor layer and said second phosphor layer coupled with said limited proportion of visible radiations generated by said discharge causing the total visible emissions from said energized lamp to fall within the warm-white ellipse as inscribed on the x-y chromaticity diagram of the ICI system.

2. The lamp as specified in claim 1, wherein said first phosphor layer has a coating weight of from about 1 mg/cm$^2$ to about 3.1 mg/cm$^2$, said second phosphor layer has a coating weight of from about 1 mg/cm$^2$ to about 3.1 mg/cm$^2$, and the combined coating weights of said first phosphor layer and said second phosphor layer fall within the range of from about 3.1 mg/cm$^2$ to about 5.5 mg/cm$^2$.

3. The lamp as specified in claim 2, wherein said apatite-structured calcium fluorophosphate phosphor and said yttrium oxide phosphor are finely divided and uniformly mixed as said first phosphor layer, with the relative weight proportions of said apatite-structured calcium fluorophosphate phosphor and said yttrium oxide phosphor being about 79:21.

4. The lamp as specified in claim 3, wherein said second phosphor layer is a mixture of strontium chlorophosphate activated by divalent europium as the narrow-band blue-emitting phosphor, zinc silicate activated by manganese as the green-emitting phosphor, and additional yttrium oxide activated by trivalent europium as the red-orange-emitting phosphor, with the weight ratios of blue to green to red-orange emitting phosphors of said second phosphor layer being about 4:24:72.

* * * * *